(12) United States Patent
Kubota et al.

(10) Patent No.: US 7,867,615 B2
(45) Date of Patent: *Jan. 11, 2011

(54) HEAT-RESISTANT EXFOLIATED GRAPHITE SHEET

(75) Inventors: Shuichi Kubota, Fujisawa (JP); Kouhei Kurose, Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/528,155

(22) PCT Filed: Sep. 25, 2003

(86) PCT No.: PCT/JP03/12256

§ 371 (c)(1),
(2), (4) Date: Mar. 17, 2005

(87) PCT Pub. No.: WO2004/028967

PCT Pub. Date: Apr. 8, 2004

(65) Prior Publication Data

US 2005/0253115 A1 Nov. 17, 2005

(30) Foreign Application Priority Data

Sep. 26, 1920 (JP) ............................. 2002280629

(51) Int. Cl.
*B32B 9/00* (2006.01)
(52) U.S. Cl. ..................................... 428/408
(58) Field of Classification Search ................ 428/408, 428/447; 423/445, 448, 447.1, 447.3; 264/29.1
See application file for complete search history.

(56) References Cited

U.S. PATENT DOCUMENTS

| | | | | |
|---|---|---|---|---|
| 3,423,496 A | * | 1/1969 | Olstowski | .................... 264/118 |
| 3,719,608 A | * | 3/1973 | Olstowski | .................... 252/506 |
| 4,146,401 A | | 3/1979 | Yamada et al. | |
| 4,547,434 A | | 10/1985 | Sumiyoshi et al. | |
| 4,551,393 A | | 11/1985 | Sumiyoshi et al. | |
| 4,951,954 A | | 8/1990 | MacNeill | |
| 5,194,198 A | | 3/1993 | von Bonin et al. | |

(Continued)

FOREIGN PATENT DOCUMENTS

EP  0 824 134 A1  2/1998

(Continued)

OTHER PUBLICATIONS

Translation of JP410101316A (cited by applicant).*

(Continued)

*Primary Examiner*—David R Sample
*Assistant Examiner*—Daniel Miller
(74) *Attorney, Agent, or Firm*—Nixon & Vanderhye P.C.

(57) ABSTRACT

A method of manufacturing a heat-resistant expanded graphite sheet is characterized in that after an acid-treated graphite material obtained by treating a graphite material with a strong acid is compounded with a powder of an organic phosphorus compound and is agitated and mixed uniformly to obtain a mixture, this mixture is subjected to heating treatment for 1 to 10 seconds at temperatures of 950 to 1200° C. to produce cracked gas, that gaps between graphite layers are expanded by its gas pressure to obtain expanded graphite particles having an expansion rate of 200 to 300 times, and that these expanded graphite particles are subjected to pressure molding.

3 Claims, 1 Drawing Sheet

U.S. PATENT DOCUMENTS

| | | | |
|---|---|---|---|
| 5,288,429 A | 2/1994 | von Bonin et al. | |
| 5,382,387 A * | 1/1995 | von Bonin | 252/602 |
| 5,499,825 A | 3/1996 | Maeda et al. | |
| 5,615,479 A | 4/1997 | Maeda et al. | |
| 5,909,881 A | 6/1999 | Segawa | |
| 5,997,979 A | 12/1999 | Kashima | |
| 6,102,995 A * | 8/2000 | Hutchings et al. | 106/18.15 |
| 6,152,453 A | 11/2000 | Kashima et al. | |
| 6,228,914 B1 | 5/2001 | Ford et al. | |
| 6,746,768 B2 * | 6/2004 | Greinke et al. | 428/408 |
| 6,889,983 B2 | 5/2005 | Murakami et al. | |
| 2002/0190483 A1 | 12/2002 | Murakami et al. | |
| 2003/0157015 A1 | 8/2003 | Reinheimer et al. | |
| 2006/0091616 A1 | 5/2006 | Kubota et al. | |

FOREIGN PATENT DOCUMENTS

| | | |
|---|---|---|
| EP | 1211221 | 6/2002 |
| EP | 1 323 670 A2 | 7/2003 |
| JP | 55-118987 | 9/1980 |
| JP | 1-252512 | 10/1989 |
| JP | 2635108 | 7/1997 |
| JP | 10-101316 | 4/1998 |
| JP | 10-110158 | 4/1998 |
| JP | 2001-131426 | 5/2001 |
| JP | 2001-153230 | 6/2001 |
| JP | 2001-262146 | 9/2001 |
| JP | 2002-069286 | 3/2002 |
| JP | 2002-265799 | 9/2002 |

OTHER PUBLICATIONS

JP 410101316A (Translation of abstract) cited by applicant as appliction 10101316 Pub Date: Apr. 21,1998 * Correction of previous Notice of references cited with added publication date.*

* cited by examiner

FIG. 1

HEAT-RESISTANT EXFOLIATED GRAPHITE SHEET

This application is a 371 national stage entry of the US national phase of international application PCT/JP03/12256 filed 25 Sep. 2003 which designated the U.S., the entire content of which is hereby incorporated by reference.

TECHNICAL FIELD

The present invention relates to a heat-resistant expanded graphite sheet, and more particularly to a heat-resistant expanded graphite sheet excelling in resistance to oxidative wear at high temperatures.

BACKGROUND ART

An expanded graphite sheet is formed by the following process: Graphite such as natural graphite, Kish graphite, or pyrolytic graphite is treated with concentrated sulfuric acid, concentrated nitric acid, concentrated sulfuric acid and potassium chlorate, concentrated sulfuric acid and potassium nitrate, a strong oxidizing agent such as a hydrogen peroxide, or a halide of bromine, aluminum chloride, or the like, to thereby form an intercalation compound. Graphite particles (acid-treated graphite material) formed in this intercalation compound are rapidly heated, i.e., are subjected to heating treatment, for instance, at high temperatures of 950° C. or more for 1 to 10 seconds to produce cracked gas. Gaps between graphite layers are expanded by its gas pressure to form expanded graphite particles, and these expanded graphite particles are subjected to compression forming or roll forming in the presence or absence of a binder, thereby forming an expanded graphite sheet. The expanded graphite sheet thus manufactured has heat resistance possessed by graphite itself and has flexibility; therefore, the expanded graphite sheet excels in formability such as bending and compression forming. Therefore, the expanded graphite sheets are used in extensive fields of, for example, gaskets, sealing, heat insulating material, cushion material, and the like.

As expanded graphite particles for forming this expanded graphite sheet, those exhibiting low expansion rates of 20 to 70 times and those exhibiting high expansion rates of 200 to 300 times are used. In the former case in which the expanded graphite particles exhibiting low expansion rates are used, since the binder is inevitably used for sheet formation, a decline in purity and a decline in physical properties result.

In contrast, in the latter case in which the expanded graphite particles exhibiting high expansion rates are used, since the sheet formation is made possible by the expanded graphite particles alone without using the binder, the purity of the expanded graphite sheet becomes high, and various physical properties become excellent.

The above-described expanded graphite sheet, particularly the expanded graphite sheet fabricated from expanded graphite particles exhibiting a high expansion rate, excels in various physical properties; however, if it is used in air in a high-temperature range exceeding 700° C. in terms of its working conditions, there is a problem in heat resistance, resulting in the oxidative wear of graphite. Hence, there is a drawback in that the rate of oxidative wear is high.

To overcome this drawback, an expanded graphite sheet has been proposed in which expanded graphite particles exhibiting a low expansion rate are used, and phosphoric acid or a phosphate is contained in the expanded graphite particles to suppress the oxidation of graphite (published in JP-B-54-30678). In this publication, it is disclosed that sheet formation is made possible by the use of phosphoric acid or a phosphate without using an adhesive. However, even if sheet formation is made possible, since the adhesive is basically not used, various physical properties as the expanded graphite sheet, particularly mechanical properties, uniformity of the sheet, and the like, are not necessarily satisfactory. In addition, although it is disclosed that its resistance to oxidation is improved, in cases where the expanded graphite sheet is exposed for long periods of time, oxidative wear is intense, and the resistance to oxidation is not necessarily satisfactory.

The present invention has been devised in view of the above-described circumstances, and its object is to provide a heat-resistant expanded graphite sheet which demonstrates the action of suppressing the oxidation of graphite even in a high-temperature range exceeding 700° C. and exhibits a high rate of oxidative wear resistance.

DISCLOSURE OF THE INVENTION

A heat-resistant expanded graphite sheet in accordance with a first aspect of the invention, an organic phosphorus compound is dispersedly contained in a proportion of 0.1 to 10% by weight.

According to the heat-resistant expanded graphite sheet in accordance with the first aspect, heat resistance is imparted by the organic phosphorus compound dispersedly contained in the sheet, the rate of oxidative wear resistance is high even in a wide temperature range from normal temperature to 700° C. or higher, and the heat-resistant expanded graphite sheet can be used in various applications. In addition, since this sheet possesses various properties including such as flexibility, easy workability, and the like, which are required for the expanded graphite sheets of this type, molding into a shape corresponding to the application is possible.

The amount of content of the organic phosphorus compound which is dispersedly contained in the sheet exerts effects on the heat resistance and the rate of oxidative wear of the sheet. If the content of the organic phosphorus compound is less than 0.1% by weight, it is impossible to make a sufficient contribution to heat resistance, and it is impossible to remarkably improve the rate of oxidative wear resistance of the sheet. Meanwhile, if the content exceeds 10.0% by weight, further improvement in the heat resistance cannot be expected, and an effect is not recognized in further improvement of the rate of oxidative wear resistance. In addition, if the content exceeds 10.0% by weight, a tendency of making the sheet hard is shown, hampering the flexibility which the sheet possesses.

As in the case of the heat-resistant expanded graphite sheet in accordance with a second aspect of the present invention, the organic phosphorus compound which favorably reduces the oxidative wear of expanded graphite is selected from the group consisting of an organic phosphonic acid and an ester thereof, an organic phosphinic acid and an ester thereof, a phosphoric acid ester, a phosphorous acid ester, and a hypophosphorous acid ester.

As in the case of the heat-resistant expanded graphite sheet in accordance with a third aspect of the present invention, as the organic phosphonic acid or its ester, an organic phosphonic acid or its ester which is represented by the following general formula (1) is suitably used:

(1)

in the above formula (1), $R^1$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^2$ and $R^3$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

As in the case of the heat-resistant expanded graphite sheet in accordance with a fourth aspect of the present invention, as the organic phosphinic acid or its ester, an organic phosphinic acid or its ester which is represented by the following general formula (2) is suitably used:

(2)

in the above formula (2), $R^4$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^5$ and $R^6$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

As in the case of the heat-resistant expanded graphite sheet in accordance with a fifth aspect of the present invention, as the phosphoric acid ester, a phosphoric acid ester which is represented by the following general formula (3) is suitably used:

(3)

in the above formula (3), each of $R^7$, $R^8$, and $R^9$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, providing that a case where all of them are hydrogen atoms is excluded.

As in the case of the heat-resistant expanded graphite sheet in accordance with a sixth aspect of the present invention, as the phosphorous acid ester, a phosphorous acid triester which is represented by the following general formula (4) or a phosphorous acid diester or a phosphorous acid monoester which is represented by the following general formula (5) is suitably used:

(4)

(5)

in the above formulae (4) and (5), each of $R^{10}$, $R^{11}$, and $R^{12}$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^{13}$ and $R^{14}$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, providing that a case where both of $R^{13}$ and $R^{14}$ are hydrogen atoms is excluded.

As in the case of the heat-resistant expanded graphite sheet in accordance with a seventh aspect of the present invention, as the hypophosphorous acid ester, a hypophosphorous acid diester (phosphonite) which is represented by the following general formula (6) or a hypophosphorous acid monoester which is represented by the following general formula (7) is suitably used:

(6)

(7)

in the above formulae (6) and (7), $R^{15}$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^{16}$, $R^{17}$, and $R^{18}$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

According to the present invention, by compounding the acid-treated graphite material with a predetermined amount of an organic phosphorus compound, it is possible to provide a heat-resistant expanded graphite sheet which exhibits a high rate of oxidative wear resistance even at temperatures exceeding 700° C.

Hereafter, a more detailed description will be given of the present invention and its embodiments. It should be noted that the present invention is not limited to these embodiments.

BEST MODE FOR CARRYING OUT THE INVENTION

A description will be given of a method of manufacturing a heat-resistant expanded graphite sheet.

<Method of Manufacturing Heat-resistant Expanded Graphite Sheet: I>

While 300 parts by weight of concentrated sulfuric acid with a concentration of 98% is being agitated, 5 parts by weight of a 60% aqueous solution of hydrogen peroxide is added as an oxidizer, and this is used as a reaction liquid. This reaction liquid is cooled and held at a temperature of 10° C., a scaly natural graphite powder with a particle size of 30 to 80 meshes is added, and reaction is allowed to take place for 30 minutes. After the reaction, the acid-treated graphite is separated by suction and filtration, and a cleaning operation in which the acid-treated graphite is agitated in water for 10 minutes and is sucked and filtered is repeated twice, thereby sufficiently removing the sulfuric acid content from the acid-treated graphite. Next, the acid-treated graphite from which the sulfuric acid content has been removed sufficiently is dried for three hours in a drying furnace held at a temperature of 110° C., and this is used as the acid-treated graphite material.

While the acid-treated graphite material is being agitated, the acid-treated graphite material is compounded with a powder or a solution of an organic phosphorus compound in a predetermined proportion of amount and is agitated uniformly to obtain a mixture. This mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 200 to 300 times). These expanded graphite particles are fed to a twin roller apparatus and is subjected to roll forming, thereby fabricating a heat-resistant expanded graphite sheet having a desired thickness.

<Method of Manufacturing Heat-Resistant Expanded Graphite Sheet: II>

The acid-treated graphite material is fabricated in the same way as in the above-described manufacturing method I. This acid-treated graphite material is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 200 to 300 times). The expanded graphite particles thus obtained are compounded with a powder or a solution of an organic phosphorus compound in a predetermined proportion of amount and is agitated uniformly to obtain a mixture. This mixture is fed to the twin roller apparatus and is subjected to roll forming, thereby fabricating a heat-resistant expanded graphite sheet having a desired thickness.

The heat-resistant expanded graphite sheets fabricated in the above-described manufacturing methods I and II are flexible sheets which contain predetermined amounts of an organic phosphorus compound and expanded graphite.

The organic phosphorus compound dispersedly contained in the heat-resistant expanded graphite sheet demonstrates the action of suppressing the oxidative wear of the expanded graphite at high temperatures exceeding 700° C. The content of the organic phosphorus compound is 0.1 to 10% by weight, preferably 0.5 to 7.0% by weight, and more preferably 2.0 to 5.0% by weight. The amount of content of the organic phosphorus compound exerts an effect on the flexibility of the heat-resistant expanded graphite sheet. If its content exceeds 10.0% by weight, a tendency of the sheet itself to become hard and brittle is shown, and the formability and workability at the time of formation into a shape and the like according to various applications are hampered. Meanwhile, if the content of the organic phosphorus compound is less than 0.1% by weight, it is difficult to sufficiently impart heat resistance, and the oxidation suppressing effect at high temperature is not sufficient.

As the organic phosphorus compounds, it is possible to cite an organic phosphonic acid or its ester, an organic phosphinic acid or its ester, a phosphoric acid ester, a phosphorous acid ester, a hypophosphorous acid ester, and the like.

As the organic phosphonic acid or its ester, an organic phosphonic acid or its ester which is represented by the following general formula (1) is suitably used:

(1)

in the above formula (1), $R^1$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^2$ and $R^3$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

The alkyl group is a straight-chain or branched-chain alkyl group (e.g., a methyl group, an ethyl group, a propyl group, an isopropyl group, an n-butyl group, a sec-butyl group, a tert-butyl group, or the like) preferably having a carbon number of 1 to 10, more preferably having a carbon number of 1 to 6. The aryl group is an aryl group (e.g., a phenyl group, a naphthyl group, an ethylphenyl group, a tolyl group, a xylyl group, or the like) preferably having a carbon number of 6 to 18, more preferably having a carbon number of 6 to 10. The aralkyl group is one (e.g., a benzyl group, a naphthylmethyl group, or the like) whose alkylene portion is straight-chain or branched-chain alkylene preferably having a carbon number of 1 to 10, more preferably having a carbon number of 1 to 6, and whose aryl portion is aryl preferably having a carbon number of 6 to 18, more preferably having a carbon number of 6 to 10.

As specific examples it is possible to cite methylphosphonic acid, ethylphosphonic acid, phenylphosphonic acid, tolylphosphonic acid, benzylphosphonic acid, methylphosphonic acid methyl, methylphosphonic acid dimethyl, methylphosphonic acid diphenyl, phenylphosphonic acid diethyl, and the like.

As the organic phosphinic acid or its ester, an organic phosphinic acid or its ester which is represented by the following general formula (2) is suitably used:

in the above formula (2), $R^4$ is an alkyl group, an aryl group, or an aralkyl group, and each of $R^5$ and $R^6$ is a hydrogen atom, an alkyl group, an aryl group, or an aralkyl group. The alkyl group, the aryl group, and the aralkyl group are the same as those described above.

As specific examples it is possible to cite methylphosphinic acid, ethylphosphinic acid, diethylphosphinic acid, methylethylphosphinic acid, phenylphosphinic acid, methylphenylphosphinic acid, diphenylphosphinic acid, methylphosphinic acid ethyl, dimethylphosphinic acid ethyl, methylphosphinic acid phenyl, phenylphosphinic acid ethyl, and the like.

As the phosphoric ester, a phosphoric ester which is represented by the following general formula (3) is suitably used:

in the above formula (3), each of $R^7$, $R^8$, and $R^9$ is a hydrogen atom, an alkyl group, an aryl group, or an aralkyl group, providing that a case where all of them are hydrogen atoms is excluded.

The alkyl group, the aryl group, and the aralkyl group are the same as those described above. As specific examples it is possible to cite methyl phosphate, butyl phosphate, phenyl phosphate, diethyl phosphate, diphenyl phosphate, dibenzyl phosphate, trimethyl phosphate, triphenyl phosphate, diphenyl cresyl phosphate, methyl diphenyl phosphate, and the like.

As the phosphorous acid ester, a phosphorous acid triester which is represented by the following general formula (4) or a phosphorous acid diester or a phosphorous acid monoester which is represented by the following general formula (5) is suitably used:

in the above formulae (4) and (5), each of $R^{10}$, $R^{11}$, and $R^{12}$ is an alkyl group, an aryl group, or an aralkyl group, and each of $R^{13}$ and $R^{14}$ is a hydrogen atom, an alkyl group, an aryl group, or an aralkyl group, providing that a case where both of $R^{13}$ and $R^{14}$ are hydrogen atoms is excluded.

The alkyl group, the aryl group, and the aralkyl group are the same as those described above. As specific examples it is possible to cite trimethyl phosphite, triphenyl phosphite, diethyl phosphite, diphenyl phosphite, butyl phosphite, phenyl phosphite, and the like.

As the hypophosphorous acid ester, a hypophosphorous acid diester (phosphonite) which is represented by the following general formula (6) or a hypophosphorous acid monoester which is represented by the following general formula (7) is suitably used:

in the above formulae (6) and (7), $R^{15}$ is a hydrogen atom, an alkyl group, an aryl group, or an aralkyl group, and each of $R^{16}$, $R^{17}$, and $R^{18}$ is an alkyl group, an aryl group, or an aralkyl group.

The alkyl group, the aryl group, and the aralkyl group are the same as those described above. As specific examples it is possible to cite dimethyl phosphonite, diphenyl phosphonite, dibenzyl phosphonite, diethyl phosphonite, methyl hypophosphite, ethyl hypophosphite, phenyl hypophosphite, and the like.

Hereafter, a more detailed description will be given of the present invention by explaining the examples. It should be noted that the present invention is not limited to these examples.

EXAMPLES

Examples 1 to 8

While 300 parts by weight of concentrated sulfuric acid with a concentration of 98% was being agitated, 5 parts by weight of a 60% aqueous solution of hydrogen peroxide was added as an oxidizer, and this was used as a reaction liquid. This reaction liquid was cooled and held at a temperature of 10° C., 100 parts by weight of a scaly natural graphite powder with a particle size of 30 to 80 meshes was added, and reaction was allowed to take place for 30 minutes. After the reaction, the acid-treated graphite was separated by suction and filtration, and a cleaning operation in which the acid-treated graphite was agitated in 300 parts by weight of water for 10 minutes and was sucked and filtered was repeated twice, thereby sufficiently removing the sulfuric acid content from the acid-treated graphite. Next, the acid-treated graphite from which the sulfuric acid content was removed sufficiently was dried for three hours in a drying furnace held at a temperature of 110° C., and this was used as the acid-treated graphite material.

While 100 parts by weight of the acid-treated graphite material was being agitated, the acid-treated graphite material was compounded with (1) 0.1 parts by weight, (2) 0.5 parts by weight, (3) 1.0 parts by weight, (4) 2.0 parts by weight, (5) 4.2 parts by weight, (6) 6.4 parts by weight, (7) 8.7 parts by weight, and (8) 11.1 parts by weight, respectively, of a powder of phenylphosphonic acid as the organic phosphorus compound, and was agitated uniformly, thereby obtaining 8 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the phenylphosphonic acid was dispersedly contained in the expanded graphite particles. These expanded graphite particles were subjected to roll forming by being passed through a reduction roll, thereby fabricating expanded graphite sheets having a thickness of 0.38 mm. These expanded graphite sheets respectively contained (1) 0.1% by weight of phenylphosphonic acid and 99.9% by weight of expanded graphite, (2) 0.5% by weight of phenylphosphonic acid and 99.5% by weight of expanded graphite, (3) 1.0% by weight of phenylphosphonic acid and 99.0% by weight of expanded graphite, (4) 2.0% by weight of phenylphosphonic acid and 98.0% by weight of expanded graphite, (5) 4.0% by weight of phenylphosphonic acid and 96.0% by weight of expanded graphite, (6) 6.0% by weight of phenylphosphonic acid and 94.0% by weight of expanded graphite, (7) 8.0% by weight of phenylphosphonic acid and 92.0% by weight of expanded graphite, and (8) 10.0% by weight of phenylphosphonic acid and 90.0% by weight of expanded graphite.

Examples 9 to 12

The acid-treated graphite material was fabricated in the same way as in the above-described Examples. While 100 parts by weight of the acid-treated graphite material was being agitated, the acid-treated graphite material was compounded with (9) 1.0 parts by weight, (10) 2.0 parts by weight, (11) 4.2 parts by weight, and (12) 6.4 parts by weight, respectively, of a powder of phenylphosphonic acid diethyl as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the phenylphosphonic acid diethyl was dispersedly contained in the expanded graphite particles.

These expanded graphite particles were subjected to roll forming by being passed through the reduction roll, thereby fabricating expanded graphite sheets having a thickness of 0.38 mm. The expanded graphite sheets thus fabricated respectively contained (9) 1.0% by weight of phenylphosphonic acid diethyl and 99.0% by weight of expanded graphite, (10) 2.0% by weight of phenylphosphonic acid diethyl and 98.0% by weight of expanded graphite, (11) 4.0% by weight of phenylphosphonic acid diethyl and 96.0% by weight of expanded graphite, and (12) 6.0% by weight of phenylphosphonic acid diethyl and 94.0% by weight of expanded graphite.

Examples 13 to 16

The acid-treated graphite material was fabricated in the same way as in the above-described Examples. While 100 parts by weight of the acid-treated graphite material was being agitated, the acid-treated graphite material was compounded with (13) 1.0 parts by weight, (14) 2.0 parts by weight, (15) 4.2 parts by weight, and (16) 6.4 parts by weight, respectively, of a powder of diphenylphosphinic acid as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the diphenylphosphinic acid was dispersedly contained in the expanded graphite particles.

These expanded graphite particles were subjected to roll forming by being passed through the reduction roll, thereby fabricating expanded graphite sheets having a thickness of 0.38 mm. The expanded graphite sheets thus fabricated respectively contained (13) 1.0% by weight of diphenylphosphinic acid and 99.0% by weight of expanded graphite, (14) 2.0% by weight of diphenylphosphinic acid and 98.0% by weight of expanded graphite, (15) 4.0% by weight of diphenylphosphinic acid and 96.0% by weight of expanded graphite, and (16) 6.0% by weight of diphenylphosphinic acid and 94.0% by weight of expanded graphite.

Examples 17 to 20

The acid-treated graphite material was fabricated in the same way as in the above-described Examples. While 100 parts by weight of the acid-treated graphite material was being agitated, the acid-treated graphite material was compounded with (17) 1.0 parts by weight, (18) 2.0 parts by weight, (19) 4.2 parts by weight, and (20) 6.4 parts by weight, respectively, of a powder of phenylphosphinic acid as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the phenylphosphinic acid was dispersedly contained in the expanded graphite particles.

These expanded graphite particles were subjected to roll forming by being passed through the reduction roll, thereby fabricating expanded graphite sheets having a thickness of 0.38 mm. The expanded graphite sheets thus fabricated respectively contained (17) 1.0% by weight of phenylphosphinic acid and 99.0% by weight of expanded graphite, (18) 2.0% by weight of phenylphosphinic acid and 98.0% by weight of expanded graphite, (19) 4.0% by weight of phenylphosphinic acid and 96.0% by weight of expanded graphite, and (20) 6.0% by weight of phenylphosphinic acid and 94.0% by weight of expanded graphite.

Examples 21 to 24

The acid-treated graphite material was fabricated in the same way as in the above-described Examples. While 100 parts by weight of the acid-treated graphite material was being agitated, the acid-treated graphite material was compounded with (21) 1.0 parts by weight, (22) 2.0 parts by weight, (23) 4.2 parts by weight, and (24) 6.4 parts by weight, respectively, of a powder of a phosphoric acid ester, specifically diphenyl phosphate, as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the diphenyl phosphate was dispersedly contained in the expanded graphite particles.

These expanded graphite particles were subjected to roll forming by being passed through the reduction roll, thereby fabricating expanded graphite sheets having a thickness of 0.38 mm. The expanded graphite sheets thus fabricated respectively contained (21) 1.0% by weight of diphenyl phosphate and 99.0% by weight of expanded graphite, (22) 2.0% by weight of diphenyl phosphate and 98.0% by weight of expanded graphite, (23) 4.0% by weight of diphenyl phosphate and 96.0% by weight of expanded graphite, and (24) 6.0% by weight of diphenyl phosphate and 94.0% by weight of expanded graphite.

Examples 25 to 28

The acid-treated graphite material was fabricated in the same way as in the above-described Examples. While 100 parts by weight of the acid-treated graphite material was being agitated, the acid-treated graphite material was compounded by spraying with (25) 1.0 parts by weight, (26) 2.0 parts by weight, (27) 4.2 parts by weight, and (28) 6.4 parts by weight, respectively, of a solution of a phosphorous acid ester, specifically triphenyl phosphite, as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the triphenyl phosphite was dispersedly contained in the expanded graphite particles.

These expanded graphite particles were subjected to roll forming by being passed through the reduction roll, thereby fabricating expanded graphite sheets having a thickness of 0.38 mm. The expanded graphite sheets thus fabricated respectively contained (25) 1.0% by weight of triphenyl phosphite and 99.0% by weight of expanded graphite, (26) 2.0% by weight of triphenyl phosphite and 98.0% by weight of expanded graphite, (27) 4.0% by weight of triphenyl phosphite and 96.0% by weight of expanded graphite, and (28) 6.0% by weight of triphenyl phosphite and 94.0% by weight of expanded graphite.

Examples 29 to 32

The acid-treated graphite material was fabricated in the same way as in the above-described Examples. While 100 parts by weight of the acid-treated graphite material was being agitated, the acid-treated graphite material was compounded with (29) 1.0 parts by weight, (30) 2.0 parts by weight, (31) 4.2 parts by weight, and (32) 6.4 parts by weight, respectively, of a powder of a hypophosphorous acid ester, specifically dimethyl phosphonite, as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the dimethyl phosphonite was dispersedly contained in the expanded graphite particles.

These expanded graphite particles were subjected to roll forming by being passed through the reduction roll, thereby fabricating expanded graphite sheets having a thickness of 0.38 mm. The expanded graphite sheets thus fabricated respectively contained (29) 1.0% by weight of dimethyl phosphonite and 99.0% by weight of expanded graphite, (30) 2.0% by weight of dimethyl phosphonite and 98.0% by weight of expanded graphite, (31) 4.0% by weight of dimethyl phosphonite and 96.0% by weight of expanded graphite, and (32) 6.0% by weight of dimethyl phosphonite and 94.0% by weight of expanded graphite.

Comparative Examples 1 to 3

The acid-treated graphite material was fabricated in the same way as in the above-described Examples. While 100 parts by weight of the acid-treated graphite material was being agitated, the acid-treated graphite material was compounded by spraying with an aqueous solution of orthophosphoric acid with a concentration of 84% in proportions of (1) 0.33 parts by weight, (2) 0.99 parts by weight, and (3) 1.66 parts by weight, and was agitated uniformly, thereby obtaining wet mixtures. Thereafter, expanded graphite particles having an expansion rate of 250 times were fabricated in a method similar to those of the above-described Examples, and expanded graphite sheets having a thickness of 0.38 mm were fabricated in a method similar to those of the above-described Examples. In these Comparative Examples, the orthophosphoric acid compounded in the acid-treated expanded graphite material undergoes dehydration in the expansion treatment process and produces phosphorus pentoxide. The expanded graphite sheets thus fabricated respectively contained (1) 0.2% by weight of phosphorus pentoxide and 99.8% by weight of expanded graphite, (2) 0.6% by weight of phosphorus pentoxide and 99.4% by weight of expanded graphite, and (3) 1.0% by weight of phosphorus pentoxide and 99.0% by weight of expanded graphite.

Comparative Examples 4 to 6

The acid-treated graphite material was fabricated in the same way as in the above-described Examples. While 100 parts by weight of the acid-treated graphite material was being agitated, the acid-treated graphite material was compounded by spraying with a solution in which aluminum primary phosphate with a concentration of 50% in proportions of (4) 8.4 parts by weight, (5) 17.4 parts by weight, and (6) 38 parts by weight was diluted with 30 parts by weight of methanol, and was agitated uniformly, thereby obtaining wet mixtures. Thereafter, expanded graphite particles having an expansion rate of 250 times were fabricated in a method similar to those of the above-described Examples, and expanded graphite sheets having a thickness of 0.38 mm were fabricated in a method similar to those of the above-described Examples. The expanded graphite sheets thus fabricated respectively contained (4) 4.0% by weight of aluminum primary phosphate and 96.0% by weight of expanded graphite, (5) 8.0% by weight of aluminum primary phosphate and 92.0% by weight of expanded graphite, and (6) 16.0% by weight of aluminum primary phosphate and 84.0% by weight of expanded graphite.

Figure 1:
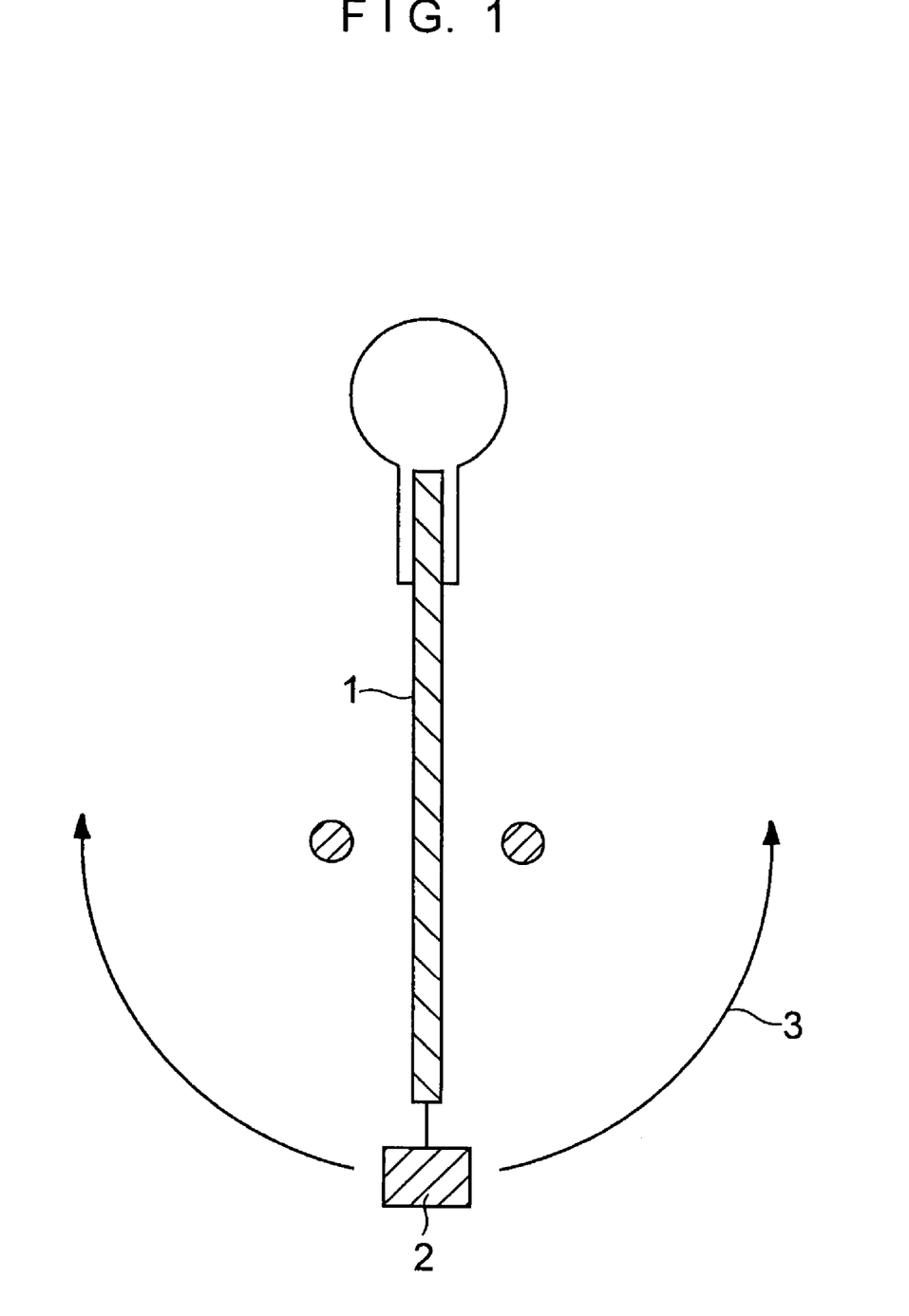
FIG. 1 is a drawing illustrating an example of a testing apparatus for evaluating the flexibility of an expanded graphite sheet.

The rate of oxidative wear was tested with respect to the expanded graphite sheets obtained in the above-described Examples 1 to 32 and Comparative Examples 1 to 6. The test method is shown by the weight reduction rate (%) of the expanded graphite sheet after the expanded graphite sheet was left to stand for 3 hours in the air held at a temperature of 720° C. Further, a test was conducted on the flexibility of the expanded graphite sheets obtained in the above-described Examples 1 to 32 and Comparative Examples 1 to 6. The results of test are shown by the number of times until the expanded graphite sheet having a width of 10 mm and a length of 100 mm was cut after being bent clockwise and counter-clockwise by angles of 90 degrees by using a testing apparatus shown in FIG. 1. In FIG. 1, reference numeral 1 denotes the expanded graphite sheet; 2, a weight of 50 g; and 3, a bending range. These test results are shown in Tables 1 to 10.

TABLE 1

|  |  | Examples | | | |
| --- | --- | --- | --- | --- | --- |
|  |  | 1 | 2 | 3 | 4 |
| Expanded graphite | | 99.9 | 99.5 | 99.0 | 98.0 |
| Organic phosphorus compound: Phenylphosphonic acid | | 0.1 | 0.5 | 1.0 | 2.0 |
| Weight reduction rate (%) | | 13.0 | 12.8 | 12.6 | 10.5 |
| Flexibility (times) | Longitudinal direction | 13 | 13 | 12 | 12 |
|  | Widthwise direction | 23 | 22 | 22 | 21 |

TABLE 2

|  |  | Examples | | | |
| --- | --- | --- | --- | --- | --- |
|  |  | 5 | 6 | 7 | 8 |
| Expanded graphite | | 96.0 | 94.0 | 92.0 | 90.0 |
| Organic phosphorus compound: Phenylphosphonic acid | | 4.0 | 6.0 | 8.0 | 10.0 |
| Weight reduction rate (%) | | 10.7 | 11.5 | 11.7 | 12.5 |
| Flexibility (times) | Longitudinal direction | 11 | 11 | 11 | 10 |
|  | Widthwise direction | 20 | 20 | 20 | 19 |

TABLE 3

|  |  | Examples | | | |
| --- | --- | --- | --- | --- | --- |
|  |  | 9 | 10 | 11 | 12 |
| Expanded graphite | | 99.0 | 98.0 | 96.0 | 94.0 |
| Organic phosphorus compound: Phenylphosphonic acid diethyl | | 1.0 | 2.0 | 4.0 | 6.0 |
| Weight reduction rate (%) | | 12.3 | 10.7 | 10.5 | 11.5 |
| Flexibility (times) | Longitudinal direction | 12 | 11 | 10 | 10 |
|  | Widthwise direction | 22 | 21 | 20 | 20 |

TABLE 4

|  |  | Examples | | | |
| --- | --- | --- | --- | --- | --- |
|  |  | 13 | 14 | 15 | 16 |
| Expanded graphite | | 99.0 | 98.0 | 96.0 | 94.0 |
| Organic phosphorus compound: Diphenylphosphinic acid | | 1.0 | 2.0 | 4.0 | 6.0 |
| Weight reduction rate (%) | | 12.0 | 11.2 | 10.8 | 11.7 |
| Flexibility (times) | Longitudinal direction | 13 | 12 | 11 | 10 |
|  | Widthwise direction | 21 | 21 | 20 | 20 |

TABLE 5

|  |  | Examples | | | |
| --- | --- | --- | --- | --- | --- |
|  |  | 17 | 18 | 19 | 20 |
| Expanded graphite | | 99.0 | 98.0 | 96.0 | 94.0 |
| Organic phosphorus compound: Phenylphosphinic acid | | 1.0 | 2.0 | 4.0 | 6.0 |
| Weight reduction rate (%) | | 13.0 | 11.4 | 11.0 | 12.0 |
| Flexibility (times) | Longitudinal direction | 13 | 12 | 12 | 11 |
|  | Widthwise direction | 22 | 21 | 20 | 20 |

TABLE 6

|  |  | Examples | | | |
| --- | --- | --- | --- | --- | --- |
|  |  | 21 | 22 | 23 | 24 |
| Expanded graphite | | 99.0 | 98.0 | 96.0 | 94.0 |
| Organic phosphorus compound: Phosphoric acid ester (diphenyl phosphate) | | 1.0 | 2.0 | 4.0 | 6.0 |
| Weight reduction rate (%) | | 13.0 | 11.4 | 11.0 | 12.0 |
| Flexibility (times) | Longitudinal direction | 13 | 12 | 12 | 11 |
|  | Widthwise direction | 22 | 21 | 20 | 20 |

TABLE 7

|  |  | Examples | | | |
| --- | --- | --- | --- | --- | --- |
|  |  | 25 | 26 | 27 | 28 |
| Expanded graphite | | 99.0 | 98.0 | 96.0 | 94.0 |
| Organic phosphorus compound: Phosphorous acid ester (triphenyl phosphite) | | 1.0 | 2.0 | 4.0 | 6.0 |
| Weight reduction rate (%) | | 13.0 | 11.6 | 11.2 | 11.8 |
| Flexibility (times) | Longitudinal direction | 13 | 12 | 12 | 12 |
|  | Widthwise direction | 21 | 22 | 20 | 20 |

TABLE 8

|  |  | Examples | | | |
| --- | --- | --- | --- | --- | --- |
|  |  | 29 | 30 | 31 | 32 |
| Expanded graphite | | 99.0 | 98.0 | 96.0 | 94.0 |
| Organic phosphorus compound: Hypophosphorous acid ester (dimethyl phosphonite) | | 1.0 | 2.0 | 4.0 | 6.0 |
| Weight reduction rate (%) | | 12.8 | 11.5 | 11.2 | 12.0 |
| Flexibility (times) | Longitudinal direction | 12.6 | 12 | 12 | 12 |
|  | Widthwise direction | 21 | 20 | 20 | 20 |

TABLE 9

|  | Comparative Examples | | |
|---|---|---|---|
|  | 1 | 2 | 3 |
| Expanded graphite | 99.8 | 99.4 | 99.0 |
| Phosphoric acid: Phosphorus pentoxide | 0.2 | 0.6 | 1.0 |
| Weight reduction rate (%) | 43.0 | 18.0 | 17.2 |
| Flexibility (times) Longitudinal direction | 13.0 | 12 | 11 |
| Widthwise direction | 22 | 22 | 21 |

TABLE 10

|  | Comparative Examples | | |
|---|---|---|---|
|  | 4 | 5 | 6 |
| Expanded graphite | 96.0 | 92.0 | 84.0 |
| Phosphate: Aluminum primary phosphate | 4.0 | 8.0 | 16.0 |
| Weight reduction rate (%) | 45.0 | 41.2 | 28.6 |
| Flexibility (times) Longitudinal direction | 12 | 10 | 10 |
| Widthwise direction | 22 | 20 | 19 |

As is apparent from the foregoing test results, as for the heat-resistant expanded graphite sheets in accordance with the Examples, the following were respectively contained dispersedly in these sheets as organic phosphorus compounds: phenylphosphonic acid (Examples 1 to 8), phenylphosphonic acid diethyl (Examples 9 to 12), diphenylphosphinic acid (Examples 13 to 16), phenylphosphinic acid (Examples 17 to 20), phosphoric acid ester (diphenyl phosphate: Examples 21 to 24), phosphorous acid ester (triphenyl phosphite: Examples 25 to 28), and hypophosphorous acid ester (dimethyl phosphonite: Examples 29 to 32). As a result, the heat-resistant expanded graphite sheets in accordance with the Examples exhibit advantages in that, in comparison with the expanded graphite sheets in the Comparative Examples, the heat resistance is improved, and that the rate of oxidative wear resistance is high even at temperatures exceeding 700° C. In addition, without impairing the various properties, such as flexibility, which graphite originally possess, the heat-resistant expanded graphite sheets in accordance with the Examples possess equivalent properties.

The invention claimed is:

1. A heat-resistant expanded graphite sheet, comprising an organic phosphorus compound selected from the group consisting of an organic phosphinic acid and an ester thereof, a phosphorous acid ester, and a hypophosphorous acid ester, and graphite particles consisting of compressed expanded graphite particles with respect to graphite particles, said expanded graphite particles having an expansion rate of 200 to 300 times being compressed, and said organic phosphorus compound being dispersedly contained in a proportion of 0.1 to 10% by weight in said sheet, the organic phosphinic acid or the ester thereof being represented by the following general formula (2):

(2)

wherein $R^4$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^5$ and $R^6$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

2. The heat-resistant expanded graphite sheet according to claim 1, wherein the phosphorous acid ester is selected from a phosphorous acid triester which is represented by the following general formula (4) and a phosphorous acid diester and a phosphorous acid monoester which are represented by the following general formula (5):

(4)

(5)

wherein each of $R^{10}$, $R^{11}$, and $R^{12}$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^{13}$ and $R^{14}$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, providing that a case where both of $R^{13}$ and $R^{14}$ are hydrogen atoms is excluded.

3. The heat-resistant expanded graphite sheet according to claim 1, wherein the hypophosphorous acid ester is a hypophosphorous acid diester (phosphonite) which is represented by the following general formula (6) or a hypophosphorous acid monoester which is represented by the following general formula (7):

(6)

(7)

wherein $R^{15}$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^{16}$, $R^{17}$, and $R^{18}$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

* * * * *